United States Patent
Dong

(10) Patent No.: US 12,471,145 B2
(45) Date of Patent: Nov. 11, 2025

(54) METHOD FOR COMMUNICATION WITH MULTIPLE CONNECTIONS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 18/064,648

(22) Filed: Dec. 12, 2022

(65) Prior Publication Data
US 2023/0103403 A1  Apr. 6, 2023

Related U.S. Application Data

(63) Continuation of application No. PCT/CN2020/102813, filed on Jul. 17, 2020.

(51) Int. Cl.
*H04W 74/0816* (2024.01)
(52) U.S. Cl.
CPC .............. *H04W 74/0816* (2013.01)
(58) Field of Classification Search
CPC ................................................ H04W 74/0816
See application file for complete search history.

(56) References Cited

U.S. PATENT DOCUMENTS

| | | | | |
|---|---|---|---|---|
| 2013/0094437 A1* | 4/2013 | Bhattacharya | ........ | H04L 1/1614 370/328 |
| 2014/0254459 A1* | 9/2014 | Gelal | ............... | H04W 74/0808 370/312 |
| 2014/0269544 A1* | 9/2014 | Zhu | ........................ | H04L 1/1671 370/329 |
| 2020/0404704 A1* | 12/2020 | Xin | ........................ | H04L 1/1819 |

OTHER PUBLICATIONS

Hirata et al.—"Discussion on Multi-link Acknowledgement", Nov. 11, 2019 (12 pages).
Hwang et al.—"Consideration on Multi-link Operation", Sep. 5, 2019 (13 pages).
International Search Report dated Apr. 8, 2021, issued in corresponding application No. PCT/CN2020/102813 (with English translation).

* cited by examiner

*Primary Examiner* — James P Duffy
(74) *Attorney, Agent, or Firm* — Oblon, McClelland, Maier & Neustadt, L.L.P.

(57) ABSTRACT

A method for communication with multiple connections is provided. The method can include sending a first message frame and a second message frame with a first connection and a second connection among the multiple connections, respectively, and resending the first message frame after a first waiting duration, in response to receiving a second feedback message frame related to the second message frame with the second connection and not receiving a first feedback message frame related to the first message frame with the first connection.

12 Claims, 3 Drawing Sheets

METHOD FOR COMMUNICATION WITH MULTIPLE CONNECTIONS

CROSS-REFERENCE TO RELATED APPLICATION

This application is based on International Patent Application No. PCT/CN2020/102813, filed on Jul. 17, 2020, the entire contents of which are incorporated herein by reference.

BACKGROUND OF THE INVENTION

Field of the Invention

The present disclosure relates to the field of communication, and more particularly, to a method and a device for communication with multiple connections.

Description of the Related Art

In May 2018, Institute of Electrical and Electronic Engineers (IEEEs) established study group (SG) IEEE802.11be to study a next generation (IEEE802.11a/b/g/n/ac) Wi-Fi technology. The scope of the study is bandwidth transmission of 320 MHz, aggregation and coordination of multiple frequency bands, etc. It is expected that the speed and throughput can be increased by at least four times compared with an existing IEEE802.11ax standard. Its main application scenarios are video transmission, augmented reality (AR), virtual reality (VR), etc.

The aggregation and coordination of multiple frequency bands mean that devices communicate with each other in frequency bands of 2.4 GHz, 5.8 GHz and 6 to 7 GHz at the same time. For the simultaneous communication between devices in multiple frequency bands, a new media access control (MAC) mechanism needs to be defined to manage it. In addition, low-latency transmission is expected to be supported in IEEE802.11be.

In the IEEE802.11be standard, a maximum bandwidth to be supported is 320 MHz (160 MHz+160 MHz), in addition to 240 MHz (160 MHz+80 MHz) and the bandwidth supported in the IEEE802.11ax standard.

In the process of establishing the IEEE802.11be standard, simultaneous Tx & Rx (STR, simultaneous transmission and reception) multi-link device (MLD) and Non-STR MLD are defined. The STR MLD is capable of performing sending and receiving simultaneously with multiple connections at the same moment, while the Non-STR MLD is capable of performing sending or receiving simultaneously with multiple connections at the same moment. In the 802.11be standard, the communication between the two devices with multiple connections will be studied.

SUMMARY OF THE INVENTION

Aspects of the present disclosure will at least solve the above problems and/or disadvantages. Various embodiments of the present disclosure provide the following technical solutions.

An aspect of the present disclosure provides a method for communication with multiple connections. The method may include sending a first message frame and a second message frame with a first connection and a second connection among the multiple connections, respectively, and resending the first message frame after a first waiting duration, in response to receiving a second feedback message frame related to the second message frame with the second connection and not receiving a first feedback message frame related to the first message frame with the first connection.

An aspect of the present disclosure provides an electronic device. The electronic device includes a memory and a processor. A computer program is stored in the memory. The processor is configured to implement the above-mentioned method when running the computer program.

An aspect of the present disclosure provides a computer-readable storage medium. The storage medium has stored therein computer programs that, when executed by a processor, cause the above-mentioned method to be implemented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Throughout the accompanying drawings, similar reference numerals are used to depict the same or similar elements, features and structures.

DETAILED DESCRIPTION OF THE PREFERRED EMBODIMENTS

Figure 1:
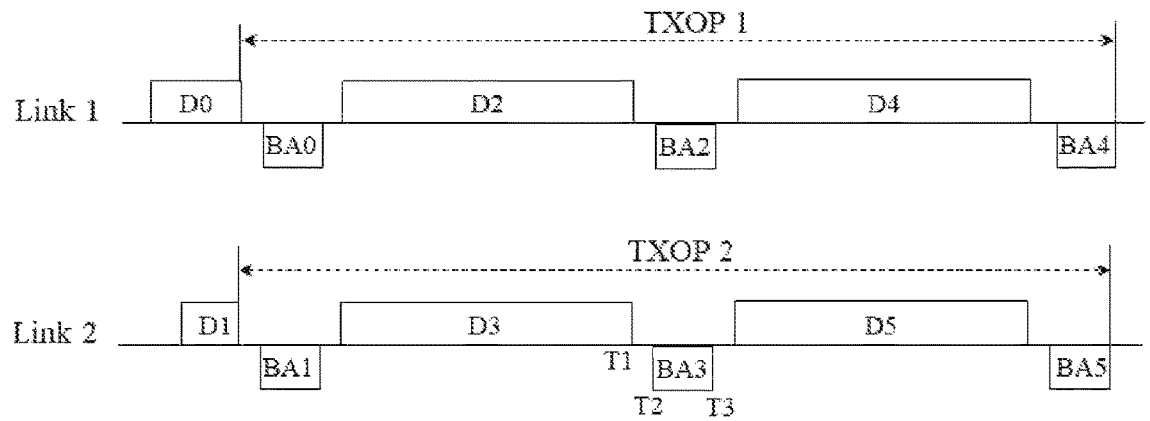
FIG. 1 is an example diagram showing a communication scenario with multiple connections according to the prior art.

Referring now to the drawings, wherein like reference numerals designate identical or corresponding parts throughout the several views.

The following description with reference to the accompanying drawings is provided to facilitate a comprehensive understanding of various embodiments of the present disclosure defined by the appended claims and their equivalents. The various embodiments of the present disclosure include various specific details, but these specific details are only considered illustrative. In addition, the description of well-known functions and constructions may be omitted for clarity and conciseness.

Terms and words used in the present disclosure are not limited to written meanings, but are used only by inventors to enable a clear and consistent understanding of the present disclosure. Therefore, for those skilled in the art, the descriptions of various embodiments of the present disclosure are provided only for the purpose of illustration, but not for the purpose of limitation.

It should be understood that "a", "an", "said" and "the" in singular forms used here can also include plural forms, unless clearly indicated in the context otherwise. It should be further understood that the word "include" used in the present disclosure refers to the existence of described features, integers, steps, operations, elements and/or assemblies, but does not exclude the existence or addition of one or more other features, integers, steps, operations, elements, assemblies and/or groups thereof.

It will be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the illustrative embodiments.

It should be understood that when an element is referred to as being "connected," or "coupled" to another element, it may be directly connected or coupled to other elements, or intervening elements may also exist. In addition, as used herein, "connected," or "coupled" may include wireless connection or wireless coupling. The term "and/or" or the expression "at least one of . . . " used herein includes any and all combinations of one or more related listed items.

To make the objects, features and advantages of the embodiments of the present disclosure clearer, the embodiments of the present disclosure will be described in detail below with reference to the accompanying drawings.

FIG. 1 is an example diagram showing a communication scenario with multiple connections. In the present disclosure, the communication scenario with multiple connections shown in FIG. 1 represents communication between STR MLD AP and Non-STR MLD STA. As mentioned above, the STR MLD AP can represent an access point (AP) that can perform sending and receiving simultaneously with multiple connections at the same moment, and the Non-STR MLD STA can represent a station (STA) that can perform sending or receiving simultaneously with multiple connections at the same moment. That is, the STR MLD AP can perform both sending and receiving operations at the same moment with multiple connections, while the Non-STR MLD STA can only perform one of sending and receiving operations at the same moment with multiple connections.

The AP may include a software application and/or a circuit so that other types of nodes in the wireless network can communicate with the outside and inside of the wireless network through the AP. In some examples, as an example, the AP may be a terminal device or a network device equipped with a Wi-Fi chip. As an example, the station STA may include, but is not limited to: a cellular phone, a smart phone, a wearable device, a computer, a personal digital assistant (PDA), a personal communication system (PCS) device, a personal information management system (PIM), a personal navigation device (PND), a global positioning system, a multimedia device, an Internet of Things (IoT) device, etc.

For the sake of description, FIG. 1 only shows two connections Link 1 and Link 2 between the STR MLD AP and the Non-STR MLD STA as an example of multiple connections. However, the present disclosure is not limited to this and may include more connections. In addition, each of the multiple connections may correspond to a respective channel for transmitting various data and/or information.

The STR MLD AP competes for a transmission opportunity (TXOP) for each of the multiple connections according to the amount of data to be sent, and encapsulates the data sequentially at the MAC layer, thus transmitting the encapsulated data (also referred to as "data frame") during the TXOP. It can be understood that the TXOP is a duration that the STR MLD AP has occupied with multiple connections for sending data frames and receiving block acknowledge (BA) or acknowledge (ACK) frames.

Referring to FIG. 1, the STR MLD AP obtains the TXOP with two connections respectively, and the TXOP duration with the two connections is the same, that is, the STR MLD AP seizes the channel to communicate with the Non-STR STA. As an example, the STR MLD AP can transmit encapsulated downlink data (D0 to D5) to the Non-STR STA during TXOP 1 with the Link 1 and during TXOP 2 with the Link 2.

Under normal operation, the STR MLD AP needs to receive a feedback, such as BA/ACK, from the Non-STR MLD STA after each transmission of downlink data is completed. Referring to FIG. 1, under normal operation, the STR MLD AP can receive a respective feedback BA0, BA2, or BA4, after each transmission of downlink data D0, D2 or D4 with the Link 1 is completed, for example, after a specific time interval. The STR MLD AP can receive a respective feedback BA1, BA3, or BA5 from Non-STR MLD STA, after each transmission of downlink data D1, D3 or D5 with the Link 2 is completed, for example, after a specific time interval. For example, the specific time interval may be a time interval between T1 and T2 in FIG. 1. As an example, the specific time interval may be a short interframe space (SIFS).

Figure 2:
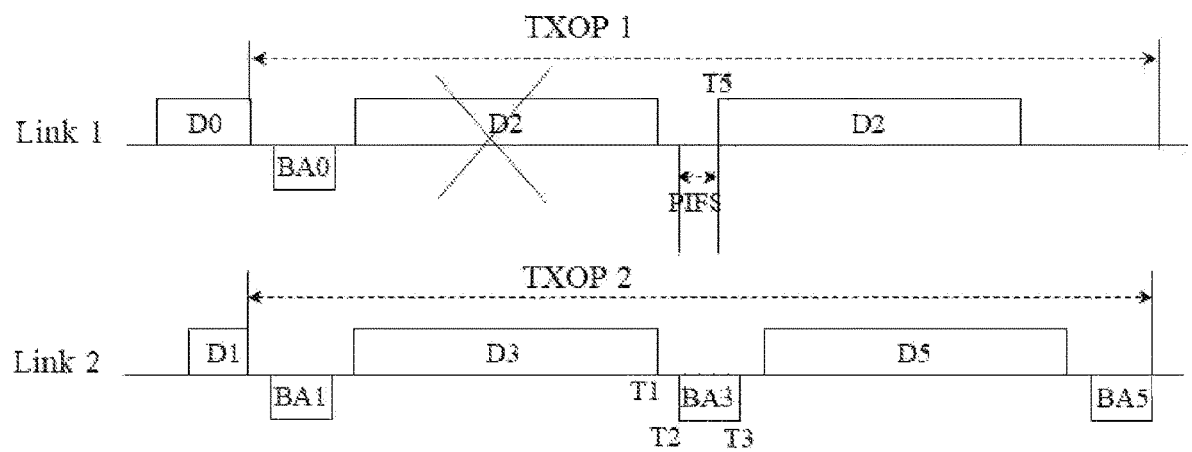
FIG. 2 is an example diagram showing an abnormal communication scenario with multiple connections.

Referring to FIG. 2, with the Link 1, after the STR MLD AP sends the downlink data D2 due to various abnormal reasons, the BA2 fed back from the Non-STR MLD AP is not received (which can be called error occurrence in Link 1) after a preset time interval (for example, SIFS). Then the STR MLD AP can wait for another time interval (for example, point coordination function interframe space (PIFS)), and then resend the D2 to the Non-STR MLD STA, but the Non-STR MLD STA will send the feedback BA3 to the AP with the Link 2 at the same time. Since the station sending the BA3 is a Non-STR station (which cannot support sending and receiving simultaneously, that is, only one of sending and receiving operations can be performed at the same moment), the sending of BA3 by the Non-STR MLD STA with the Link 2 will cause interference to the reception of D2 with the Link 1, as shown in the shaded part of FIG. 2. That is, because the existing standard only applies to communication with a single connection, but not to communication with multiple connections, the communication mechanism with multiple connections needs to be enhanced.

Figure 3:
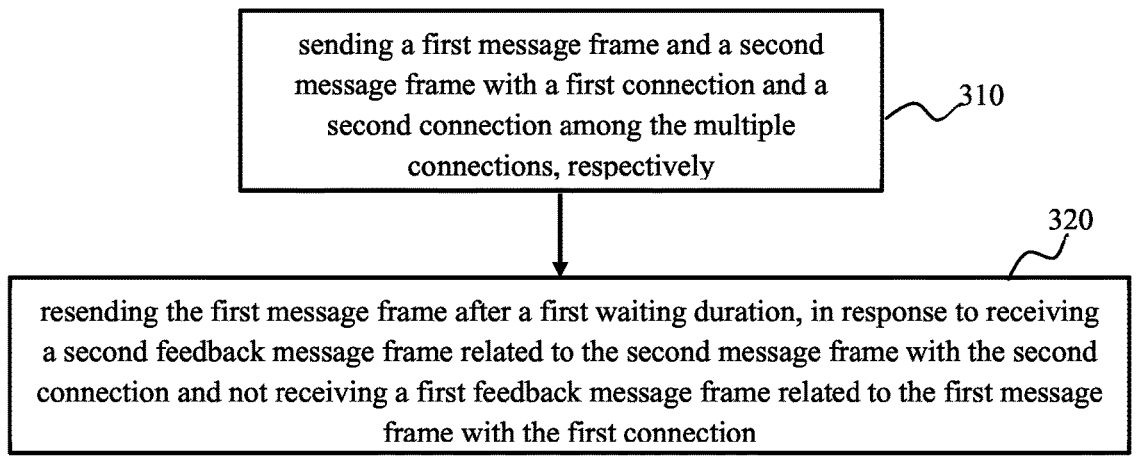
FIG. 3 is a flowchart showing a method for communication with multiple connections according to an illustrative embodiment of the present disclosure.
Figure 4:
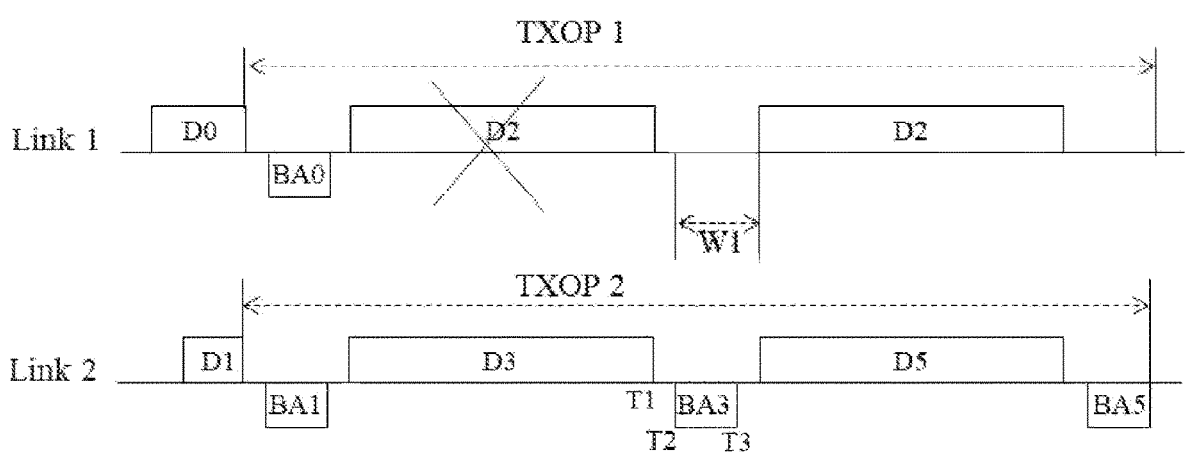
FIG. 4 is an example diagram showing a communication scenario with multiple connections according to an illustrative embodiment of the present disclosure.

FIG. 3 is a flowchart showing a method for communication with multiple connections according to an illustrative embodiment of the present disclosure. FIG. 4 is an example diagram showing a communication scenario with multiple connections according to an illustrative embodiment of the present disclosure.

Referring to FIG. 3, in step 301, a first message frame and a second message frame are sent with a first connection and a second connection among the multiple connections, respectively.

For the convenience of illustration, in FIG. 4, the first connection may correspond to Link 1, the second connection may correspond to Link 2, the first message frame sent with the first connection may correspond to D2, and the second message frame sent with the second connection may correspond to D3. In the present disclosure, message frames such as the first message frame and the second message frame may be referred to as downlink data or data frames. However, this is only illustrative, and the illustrative embodiments of the present disclosure are not limited thereto.

Continuing to refer to FIG. 3, in step 320, the first message frame is resent after a first waiting duration, in response to receiving a second feedback message frame related to the second message frame with the second connection and not receiving a first feedback message frame related to the first message frame with the first connection.

For the convenience of illustration, referring to FIG. 4, the second feedback message frame related to the second message frame may correspond to the BA3, the first feedback message frame related to the first message frame may correspond to the BA2 (FIG. 1), and the first waiting duration may correspond to W1. In the present disclosure, feedback message frames such as the first feedback message frame and the second feedback message frame may also be referred to as uplink frames.

Specifically, as shown in FIG. 4, after sending the downlink data D2 with the Link 1, for example, the block acknowledge BA2 related to the downlink data D2 is not received after a specific time interval (for example, SIFS). Thus, it can be determined that an error occurs during the transmission of the downlink data D2 with the Link 1, so the transmission continues with this connection, and the waiting duration with this connection corresponds to the first waiting duration W1.

Continuing to refer to FIG. 4, although the error occurs during the transmission of the downlink data D2 with the Link 1, there is no error in the transmission of the downlink data D3 with the Link 2, that is, after sending the downlink data D3, the block acknowledge BA3 related to the downlink data D3 is received after a specific time interval (for example, SIFS).

According to an illustrative embodiment of the present disclosure, the first waiting duration W1 may be determined according to the block acknowledge BA3 received with the Link 2. That is, the communication method according to the illustrative embodiment of the present disclosure may further include determining the first waiting duration according to the second feedback message frame.

According to an illustrative embodiment of the present disclosure, the first waiting duration may be determined according to a sum of a duration of the second feedback message frame and a first interval. In an embodiment of the present disclosure, the first interval may correspond to the SIFS, that is, to the specific time interval described above. As an example, the sum of the duration of the second feedback message frame (BA2) and the first interval (for example, SIFS) can be directly determined as the first waiting duration W1. However, this is only illustrative, and the illustrative embodiments of the present disclosure are not limited thereto.

In addition, according to the illustrative embodiment of the present disclosure, the first waiting duration can be determined according to the normally received uplink frame (i.e., the feedback message frame) with any one of the multiple connections. That is, the first waiting duration can be determined according to the uplink frame (i.e., the feedback message frame) received with any connection when there is no error. For example, referring to FIG. 4, the first waiting duration may be determined based on any one of the feedback message frame BA0 related to the data frame D0 received with the Link 1, the feedback message frame BA1 related to the data frame D1 received with the Link 2, and the feedback message frame BA3 related to the data frame D3 received with the Link 2. As an example, the first waiting duration may be determined according to a sum of a duration of any feedback message frame (for example, any one of BA0, BA1 and BA3) normally received with any one of multiple connections and the first interval.

The communication scenario with multiple connections according to the embodiment of the present disclosure may be a time synchronization scenario. For example, the start transmission time of each sending of data frame with the Link 1 may be the same as or different from that of each sending of data frame with the Link 2, and the end transmission time of each sending of data frame with the Link 1 may be the same as that of each sending of data frame with the Link 2. Referring to FIG. 4, the start time of sending data frame D0 is different from that of sending data frame D1, but the end time of sending data frame D0 is the same as that of sending data frame D2. The start time and the end time of sending data frame D2 and data frame D3 are the same. However, this is only illustrative, and the embodiments of the present disclosure are not limited thereto.

Referring to FIG. 4, when the first message frame is resent after the first waiting duration, as described in step 320, since the first waiting duration is determined based on the second message frame, as shown in the shaded part of FIG. 4, the sending of the BA3 of the Non-STR MLD STA with the Link 2 can be prevented from interfering with the reception of D2 with the Link 1.

The communication method according to the embodiment of the present disclosure may further include sensing a first channel configured to transmit the first message frame with the first connection (i.e., the first channel corresponding to the first connection) before resending the first message frame.

Considering that the communication scenario with the multi-connection of the present disclosure is a time synchronization scenario, that is, with each connection, start transmission time points and end transmission time points of data frames are the same, or the start transmission time points are different but the end transmission time points are the same. Therefore, the STR MLD AP can obtain the desired waiting duration according to a pre-transmitted data frame, and then re-sense the channel.

In an embodiment, the communication method according to the embodiment of the present disclosure may further include sensing the first channel during a second interval with the first connection before resending the first message frame. That is, with the first connection in which an error occurs, a duration of sensing the first channel is the second interval before resending the first message frame. As an example, the second interval (i.e., the duration of sensing the first channel) may be a fixed time interval determined according to a channel communication environment, for example, 9 microseconds (µs), and the energy of the first channel may be sensed during the second interval. If the sensed energy in 4 µs exceeds a threshold (for example, an energy detection (ED) threshold) during the 9 µs, the first channel is identified as busy, that is, other devices may perform transmitting or sending with the first connection. In this case, it is possible to continue waiting and sensing the first channel until the first channel is idle, and then resend the first message frame. If there is sensed energy in 4 µs that does not exceed the threshold (for example, an ED threshold), the first channel is identified as idle, that is, the first message frame can be resent.

Sensing the first channel during the second interval with the first connection before resending the first message frame may include sensing the first channel during the second interval after an end point of the first waiting duration (refer to FIG. 4, at the end of the first waiting duration W1), that is, there is no overlapping time portion between the second interval and the first waiting duration. Alternatively, it may include sensing the first channel during the second interval between a start point and an end point of the first waiting duration (refer to FIG. 4, during the first waiting duration W1), that is, there may be an overlapping time portion between the second interval and the first waiting duration.

In an embodiment, the communication method according to the embodiment of the present disclosure may further include sensing the first channel during a first interval with the first connection in response to receiving the second feedback message frame with the second connection.

Referring to FIG. 4, when it is determined that the feedback message frame BA2 related to the message frame D2 is not received with the first connection Link 1 (for example, at moment T2), then when the feedback message frame BA3 related to the message frame D3 is received with the second connection Link 2 (for example, at moment T3 at which the reception of the feedback message frame BA3 is finished), the first channel is sensed, and the duration of sensing the first channel may be the first interval (for example, SIFS). Then, it is determined whether the first channel is busy to determine whether the first message frame D2 can be resent according to a result of sensing the first channel.

According to an embodiment of the present disclosure, the STR MLD AP competes for the TXOP according to the amount of data to be sent, and encapsulates the data sequentially at the MAC layer. However, since an error occurs in the transmission with the first connection (for example, the feedback message frame BA2 related to the first message frame D2 is not received with the first connection Link 1), the first message frame D2 needs to be retransmitted. Therefore, when the duration of the competed TXOP with the first connection ends, the encapsulated data frame is not sent completely, and the data frame which is not sent completely needs to re-compete for the TXOP. Then, for a last data frame transmitted during the TXOP with the first connection (for example, TXOP 1 with the first connection Link 1), its duration identifier field (duration field) needs to be set. Hereinafter, the duration identifier field may be abbreviated as a duration identifier.

According to an embodiment of the present disclosure, a duration identifier in a last message frame is set according to a duration of the last message frame with the first connection, in response to the last message frame to be sent during a transmission opportunity period. According to an embodiment of the present disclosure, the duration identifier can be set according to the duration of the last message frame, a duration of a feedback message frame when no error occurs, and a first interval. As an example, a value of the duration identifier can be set as a sum of the duration of the last message frame, the duration of the feedback message frame when no error occurs, and at least one time the first interval (for example, in some embodiments twice the first interval). However, this is only illustrative, and illustrative embodiments of the present disclosure are not limited thereto.

In an example, assuming that a total of 10 data frames need to be sent during the TXOP 1 with the first connection Link 1, one of the 10 data frames (for example, a second data frame D2) needs to be retransmitted (for example, retransmitted once) due to an anomaly or error, so that a last tenth data frame cannot be sent, and a ninth data frame becomes the last data frame to be sent during the TXOP 1. At this time, a duration identifier in the ninth data frame can be set according to a duration of the ninth data frame, a duration of the feedback message frame when no error occurs, and the first interval (in some embodiments, twice the first interval). For example, in some embodiments, a value of the duration identifier in the ninth data frame can be set as the duration of the ninth data frame+BA+2*SIFS.

In an example, when feedback message frames related to a plurality of data frames (for example, two data frames) are not received during the TXOP 1 with the first connection, or a data frame D2 is retransmitted for several times (for example, twice), then an eighth data frame becomes the last data frame to be sent during the TXOP 1 with the first connection Link 1. At this time, a duration identifier in the eighth data frame can be set according to a duration of the eighth data frame, a duration of the feedback message frame when no error occurs, and the first interval (in some embodiments, twice the first interval). For example, in some embodiments, a value of the duration identifier in the eighth data frame can be set as the duration of the eighth data frame+BA+2*SIFS.

In an example, assuming that the second data frame D2 needs to be retransmitted once and the ninth data frame becomes the last data frame to be sent during the TXOP 1 with the first connection Link 1, the duration identifier in each of the retransmitted second data frame D2 and the third data frame to the eighth data frame can be set according to existing standards based on the data frame to be transmitted, the untransmitted data frames, the feedback message frame and the first interval. For example, the duration identifier can be set as the duration of the data frame to be transmitted+a length of untransmitted data frames (set to n)+(n+1)*BA+(2+2*n)*SIFS. For example, when the second data frame D2 is retransmitted with the first Link 1, the duration identifier in the second data frame D2 can be set as the duration of the second data frame D2+durations of the third data frame to the ninth data frame (n=7)±(7+1)*BA+(2+2*7)*SIFS.

The method for communication with multiple connections described with reference to FIGS. 3 and 4 according to the illustrative embodiment of the present disclosure enables interference to be avoided with multiple connections, effectively implementing communication with multiple connections, and improving the system throughput.

Figure 5:
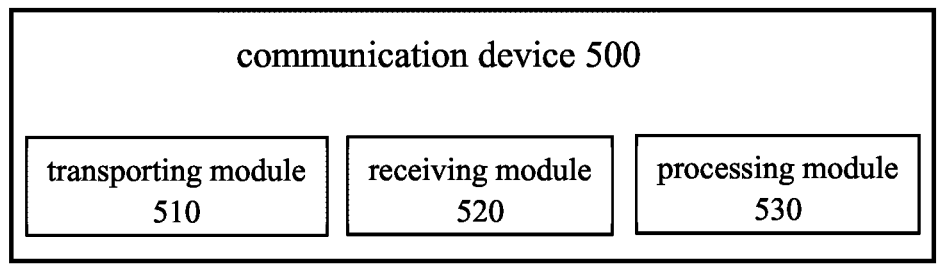
FIG. 5 is a diagram showing a device for communication with multiple connections according to an illustrative embodiment of the present disclosure.

FIG. 5 is a diagram showing a device 500 for communication with multiple connections according to an illustrative embodiment of the present disclosure. Referring to FIG. 5, the device 500 for communication with multiple connections may include a sending module 510, a receiving module 520, and a processing module 530. It will be understood that a configuration of the communication device 500 shown in FIG. 5 is only illustrative, and the communication device according to the embodiment of the present disclosure may include more or fewer modules.

According to an illustrative embodiment of the present disclosure, the sending module 510 may be configured to send a first message frame and a second message frame with a first connection and a second connection among the multiple connections, respectively.

According to an illustrative embodiment of the present disclosure, the receiving module 520 may be configured to receive a first feedback message frame related to the first message frame with the first connection and receive a second feedback message frame related to the second message frame with the second connection.

According to an illustrative embodiment of the present disclosure, the processing module 530 may be configured to determine a first waiting duration, and control the sending module 510 so that the sending module 510 resends the first message frame after the first waiting duration, in response to the receiving module 520 receiving the second feedback message frame related to the second message frame with the second connection and not receiving the first feedback message frame related to the first message frame with the first connection.

According to an illustrative embodiment of the present disclosure, the processing module 530 may be further configured to determine the first waiting duration according to the second feedback message frame.

According to an illustrative embodiment of the present disclosure, the processing module 530 may be further configured to determine the first waiting duration according to a sum of a duration of the second feedback message frame and a first interval.

According to an illustrative embodiment of the present disclosure, the processing module 530 may be further configured to sense a first channel configured to transmit the first message frame with the first connection before controlling the sending module 510 to resend the first message frame.

According to an illustrative embodiment of the present disclosure, the processing module 530 is further configured to sense the first channel during a second interval with the first connection.

According to an illustrative embodiment of the present disclosure, the processing module 530 may be further configured to sense the first channel during a first interval with the first connection in response to the receiving module 520 receiving the second feedback message frame with the second connection.

According to an illustrative embodiment of the present disclosure, the processing module 530 may be further configured to set a duration identifier in a last message frame according to a duration of the last message frame with the first connection, in response to the last message frame to be sent by the sending module 510 during a transmission opportunity period.

According to an illustrative embodiment of the present disclosure, the processing module 530 may be further configured to set the duration identifier according to the duration of the last message frame, a duration of a feedback message frame when no error occurs, and a first interval (in some embodiments, twice the first interval).

According to the illustrative embodiment of the present disclosure, the device for communication with multiple connections enables interference to be avoided with multiple connections, effectively implementing communication with multiple connections, and improving the system throughput.

In addition, the "modules" in FIG. 5 can be implemented by a combination of software and/or hardware, and this is not particularly limited in the embodiment of the present disclosure.

Based on the same principle as the method provided by the embodiments of the present disclosure, an embodiment of the present disclosure also provides an electronic device, which includes a processor and a memory. Machine-readable instructions (which also can be referred to as "computer programs") are stored in the memory. The processor is configured to execute the machine-readable instructions to implement the method described with reference to FIGS. 3 and 4.

An embodiment of the present disclosure also provides a computer-readable storage medium having stored therein computer programs that, when executed by a processor, cause the method described with reference to FIGS. 3 and 4 to be implemented.

In an illustrative embodiment, the processor may be a logic block, a module and a circuit for implementing or executing various examples described in connection with the present disclosure, such as a central processing unit (CPU), a generic processor, a digital signal processor (DSP), an application specific integrated circuit (ASIC), a field programmable gate array (FPGA) or other programmable logic devices, transistor logic devices, hardware components or any combination thereof. The processor can also be a combination that implements computing functions, such as including a combination of one or more microprocessors, and a combination of the DSP and the microprocessor.

In an illustrative embodiment, the memory may be, for example, a read only memory (ROM), a random access memory (RAM), an electrically erasable programmable read only memory (EEPROM), a compact disc read only memory (CD-ROM) or other optical disc storage, optical disk storage (including compact disk, laser disk, optical disk, digital versatile disk, Blu-ray disk, etc.), magnetic disc storage media or other magnetic storage devices, or any other media that can be used to carry or store program codes in the form of instructions or data structures and can be accessed by a computer, but is not limited to this.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the present disclosure has been shown and described with reference to certain embodiments thereof, it will be understood by those skilled in the art that various changes in form and details can be made without departing from the scope of the present disclosure. Therefore, the scope of the present disclosure should not be limited to the embodiments, but should be defined by the appended claims and their equivalents.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for communication with multiple connections, comprising:
sending a first message frame and a second message frame with a first connection and a second connection among the multiple connections, respectively; and
resending the first message frame after a first waiting duration, in response to receiving a second feedback message frame related to the second message frame with the second connection and not receiving a first feedback message frame related to the first message frame with the first connection due to an error occurring during transmission of the first message frame, wherein the first waiting duration is determined according to a sum of a duration of the second feedback message frame and a first interval, and the first interval is a short interframe space (SIFS); and
setting a duration identifier in a last message frame according to a duration of the last message frame, a duration of a feedback message frame when no error occurs, and twice the first interval, in response to the last message frame to be sent with the first connection during a transmission opportunity period.

2. The communication method of claim 1, further comprising:
sensing a first channel configured to transmit the first message frame with the first connection before resending the first message frame.

3. The communication method of claim 2, wherein sensing the first channel configured to transmit the first message frame comprises:
sensing the first channel during a second interval with the first connection.

4. The communication method of claim 2, wherein sensing the first channel configured to transmit the first message frame comprises:
sensing the first channel during a first interval with the first connection in response to receiving the second feedback message frame with the second connection.

5. An electronic device, comprising:
a memory;
a processor; and
a computer program stored in the memory and executable on the processor,
wherein the processor is configured to:
send a first message frame and a second message frame with a first connection and a second connection among the multiple connections, respectively; and
resend the first message frame after a first waiting duration, in response to receiving a second feedback message frame related to the second message frame with the second connection and not receiving a first feedback message frame related to the first message frame with the first connection due to an error occurring during transmission of the first message frame, wherein the first waiting duration is determined according to a sum of a duration of the second feedback message frame and a first interval, and the first interval is a short interframe space (SIFS); and
set a duration identifier in a last message frame according to a duration of the last message frame, a duration of a feedback message frame when no error occurs, and twice the first interval, in response to the last message frame to be sent with the first connection during a transmission opportunity period.

6. The electronic device of claim 5, wherein the processor is configured to:
sense a first channel configured to transmit the first message frame with the first connection before resending the first message frame.

7. The electronic device of claim 6, wherein the processor is configured to:
sense the first channel during a second interval with the first connection.

8. The electronic device of claim 6, wherein the processor is configured to:
sense the first channel during a first interval with the first connection in response to receiving the second feedback message frame with the second connection.

9. A computer-readable storage medium having stored therein computer programs that, when executed by a processor, cause the processor to:
send a first message frame and a second message frame with a first connection and a second connection among the multiple connections, respectively; and
resend the first message frame after a first waiting duration, in response to receiving a second feedback message frame related to the second message frame with the second connection and not receiving a first feedback message frame related to the first message frame with the first connection due to an error occurring during transmission of the first message frame, wherein the first waiting duration is determined according to a sum of a duration of the second feedback message frame and a first interval, and the first interval is a short interframe space (SIFS); and
set a duration identifier in a last message frame according to a duration of the last message frame, a duration of a feedback message frame when no error occurs, and twice the first interval, in response to the last message frame to be sent with the first connection during a transmission opportunity period.

10. The non-transitory computer-readable storage medium of claim 9, wherein the processor is configured to:
sense a first channel configured to transmit the first message frame with the first connection before resending the first message frame.

11. The non-transitory computer-readable storage medium of claim 10, wherein the processor is configured to:
sense the first channel during a second interval with the first connection.

12. The non-transitory computer-readable storage medium of claim 10, wherein the processor is configured to:
sense the first channel during a first interval with the first connection in response to receiving the second feedback message frame with the second connection.

* * * * *